(12) United States Patent
Rabhi

(10) Patent No.: US 11,649,812 B2
(45) Date of Patent: May 16, 2023

(54) HYDRAULIC PISTON WITH A DEPRESSURIZED GROOVE

(71) Applicant: Vianney Rabhi, Lyons (FR)

(72) Inventor: Vianney Rabhi, Lyons (FR)

(*) Notice: Subject to any disclaimer, the term of this patent is extended or adjusted under 35 U.S.C. 154(b) by 122 days.

(21) Appl. No.: 17/217,835

(22) Filed: Mar. 30, 2021

(65) Prior Publication Data

US 2021/0301806 A1 Sep. 30, 2021

Related U.S. Application Data

(60) Provisional application No. 63/002,627, filed on Mar. 31, 2020.

(51) Int. Cl.
*F04B 39/00* (2006.01)
*F16J 1/00* (2006.01)
*F04B 53/14* (2006.01)

(52) U.S. Cl.
CPC ........ *F04B 39/0005* (2013.01); *F04B 53/143* (2013.01); *F16J 1/005* (2013.01)

(58) Field of Classification Search
CPC .... F04B 39/0005; F04B 53/14; F04B 53/143; F16J 1/005; F16J 1/008; F16J 1/06; F16J 1/08; F16J 9/06; F16J 9/08; F16J 9/145; F16J 9/18
See application file for complete search history.

(56) References Cited

U.S. PATENT DOCUMENTS

| | | | | | |
|---|---|---|---|---|---|
| 2,413,347 | A | * | 12/1946 | Hamilton | F04B 53/14 92/256 |
| 4,044,655 | A | * | 8/1977 | Kennicott | F04B 39/0005 29/888.044 |
| 4,355,519 | A | * | 10/1982 | Kercheval | F16J 9/00 277/449 |
| 6,431,051 | B1 | * | 8/2002 | Stoppek | F16J 1/005 92/260 |
| 9,435,336 | B2 | * | 9/2016 | Rabhi | F16J 15/164 |
| 2017/0184009 | A1 | * | 6/2017 | Vianney | F03C 1/0605 |
| 2018/0245583 | A1 | * | 8/2018 | Rabhi | F03C 1/0605 |
| 2018/0347417 | A1 | * | 12/2018 | Rabhi | F03C 1/0605 |
| 2019/0072181 | A1 | * | 3/2019 | Rabhi | F03C 1/0605 |

FOREIGN PATENT DOCUMENTS

| | | |
|---|---|---|
| FR | 3 009 037 | 1/2016 |
| WO | 2014/118477 | 8/2014 |
| WO | 2017/109329 | 6/2017 |

* cited by examiner

*Primary Examiner* — Kenneth Bomberg
*Assistant Examiner* — Matthew Wiblin
(74) *Attorney, Agent, or Firm* — Nixon & Vanderhye

(57) ABSTRACT

The hydraulic piston with a depressurized groove is capable of translating in a cylinder and includes a fixed skirt, an axial compression face which forms with the cylinder a fluid chamber, and an axial working face which cooperates with a transmission; the piston also includes a seal, a depressurized radial groove emerging onto the surface of the fixed skirt, an axial decompression duct fitted inside the skirt which emerges in the vicinity of the axial working face, and a radial decompression duct which depressurizes the radial groove in communication with the axial decompression conduit.

14 Claims, 10 Drawing Sheets

[Fig. 1]
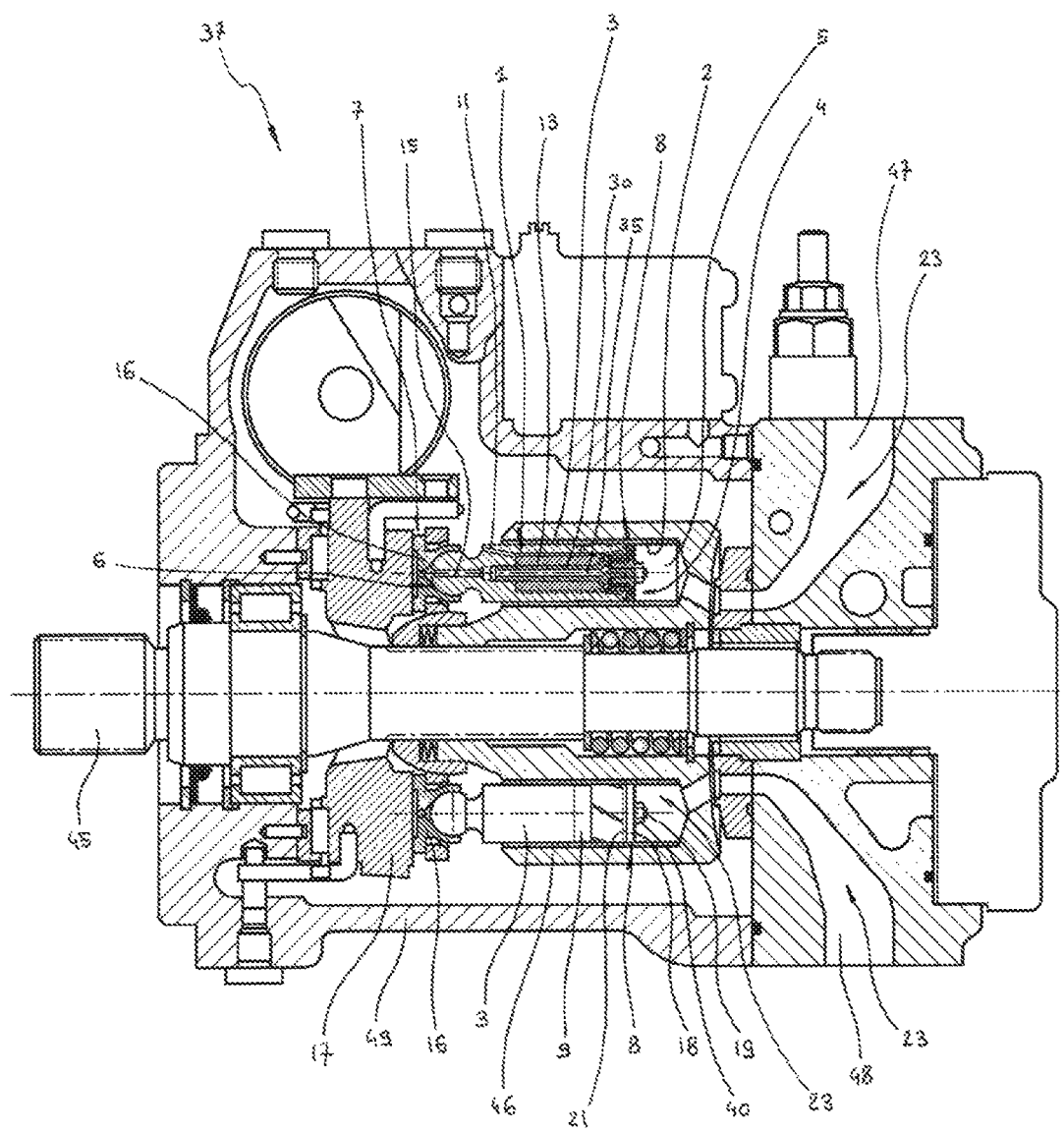

[Fig. 2]
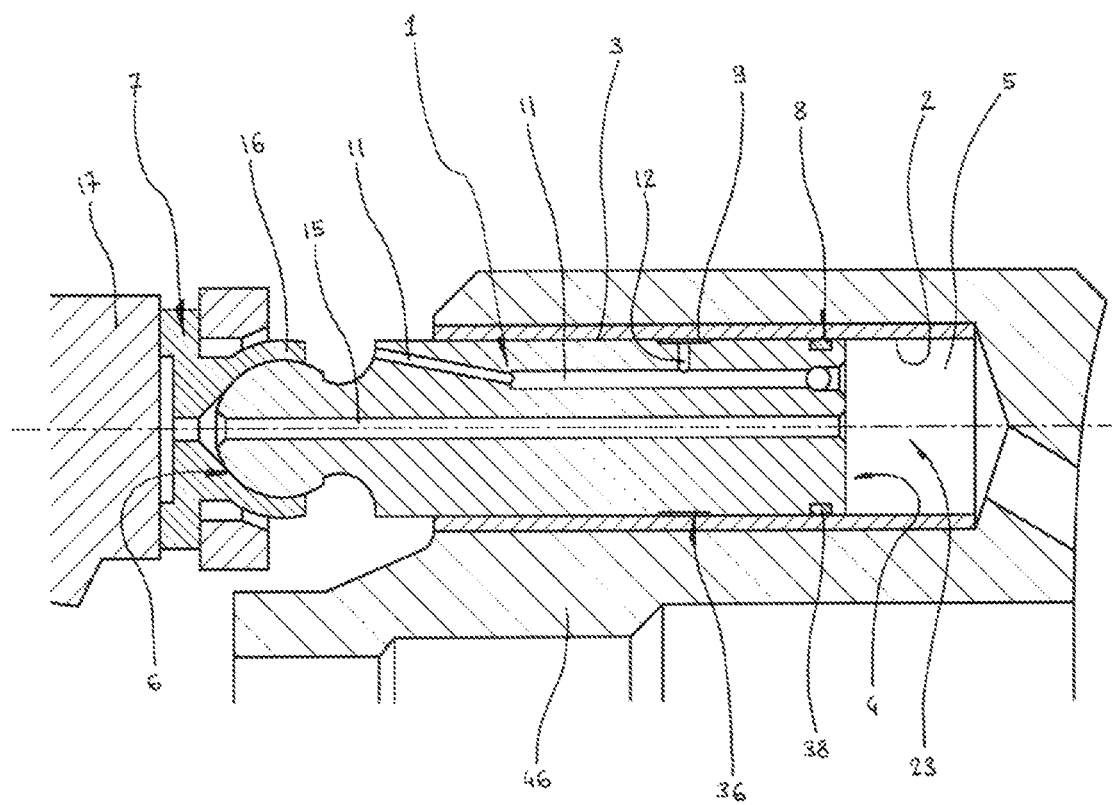

[Fig. 3]
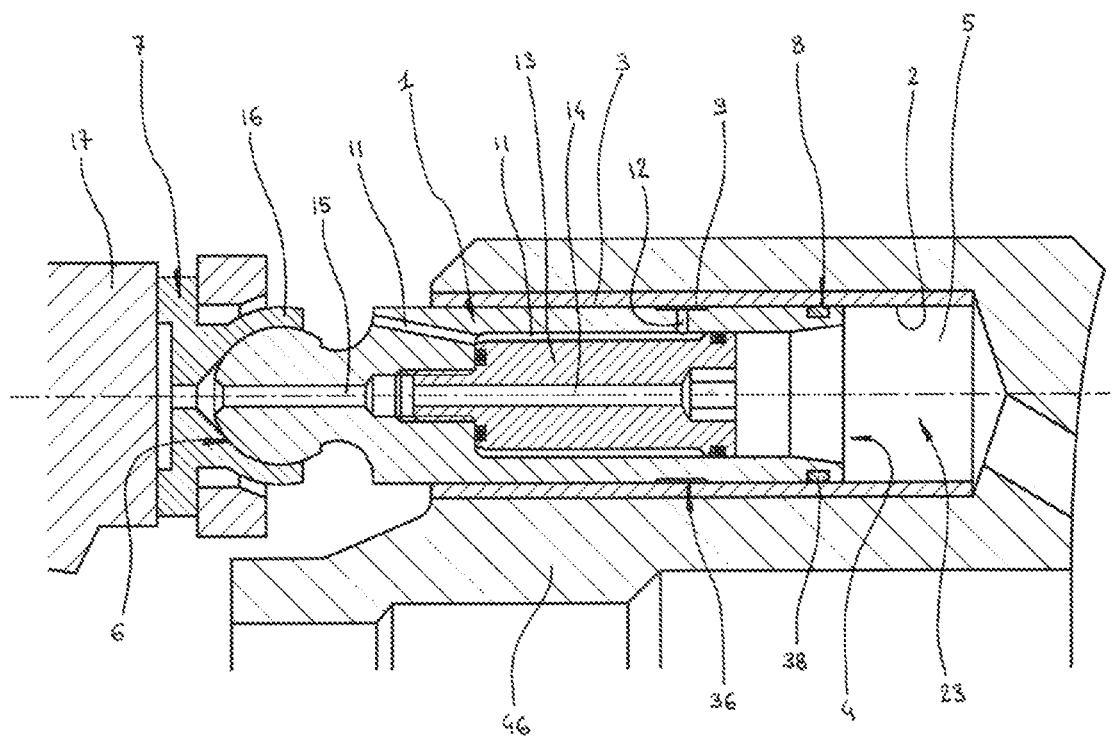

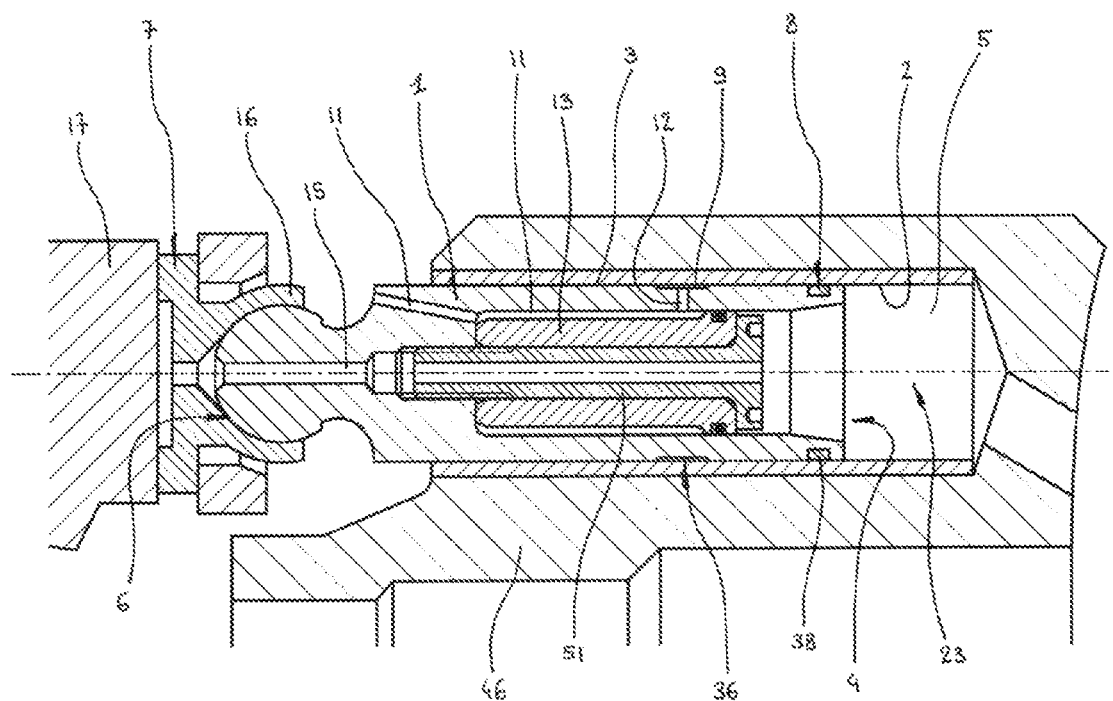
[Fig. 4]

[Fig. 5]
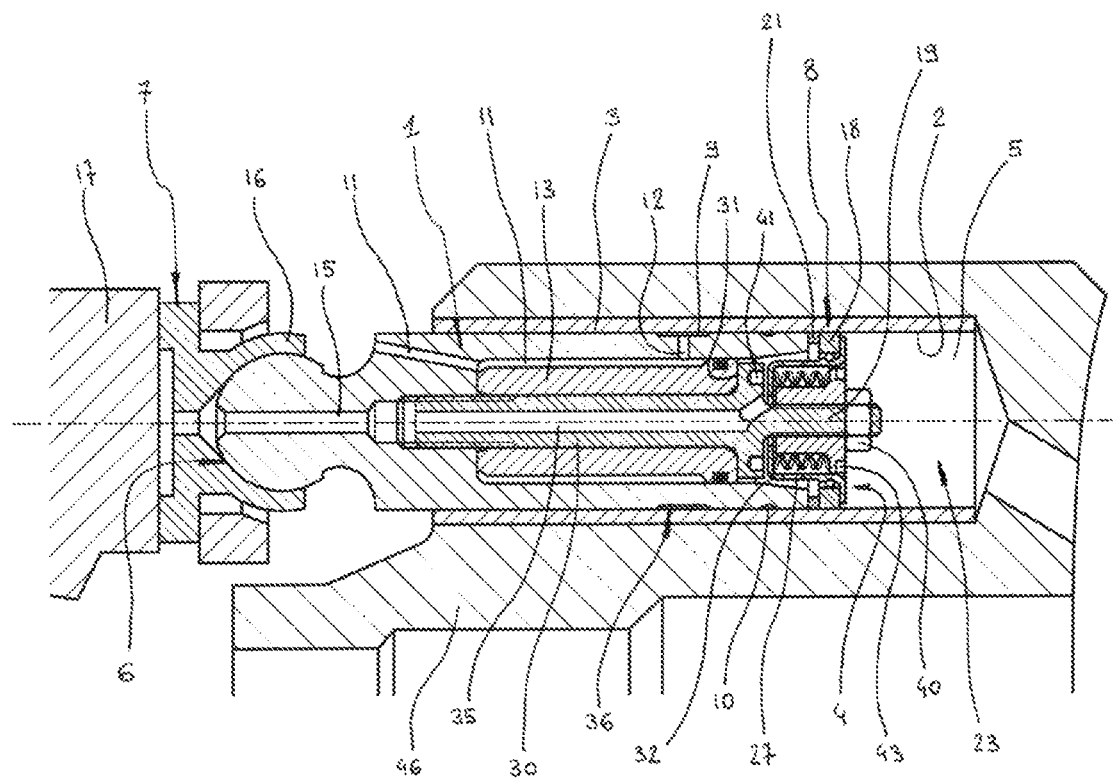

[Fig. 6]
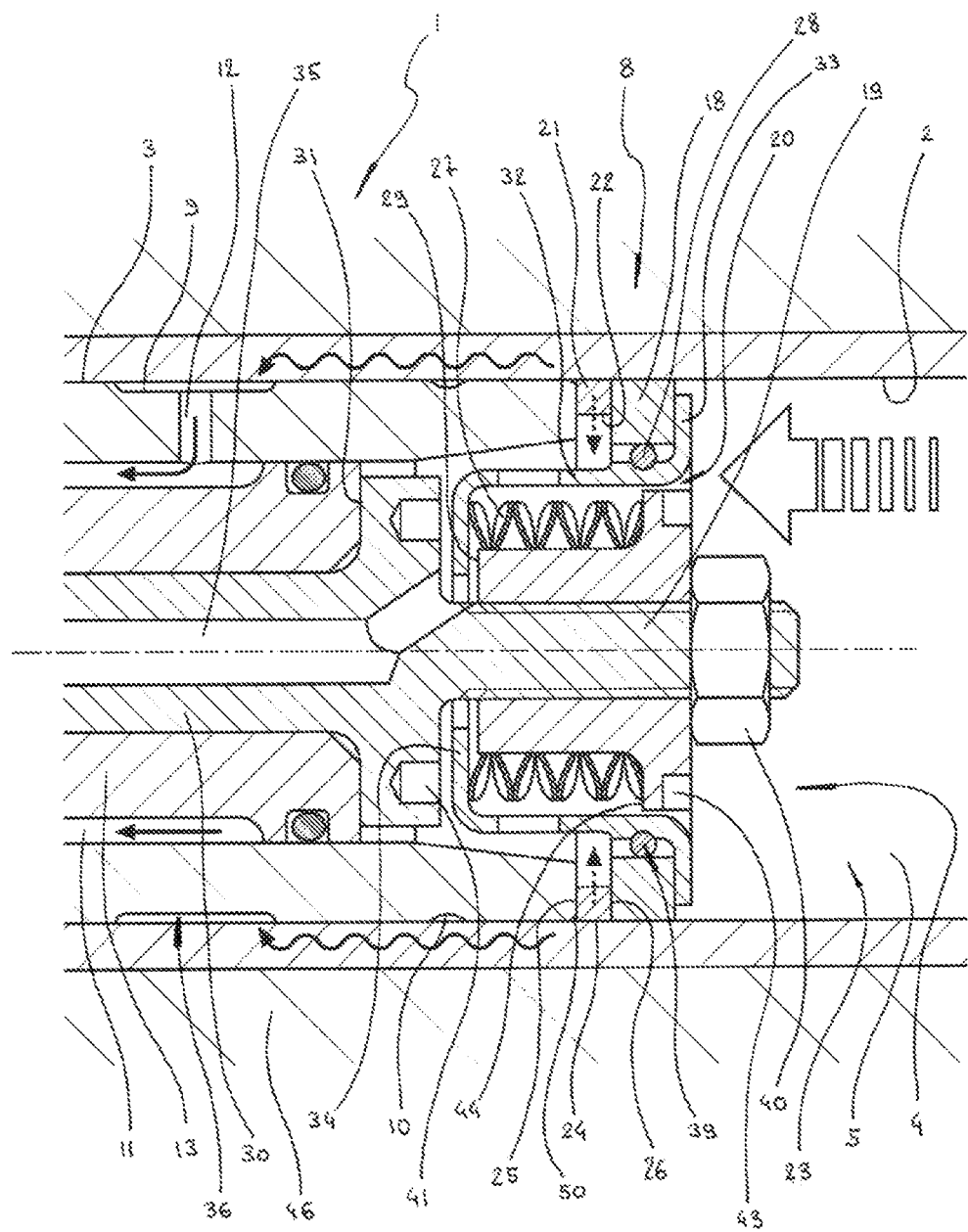

[Fig. 7]
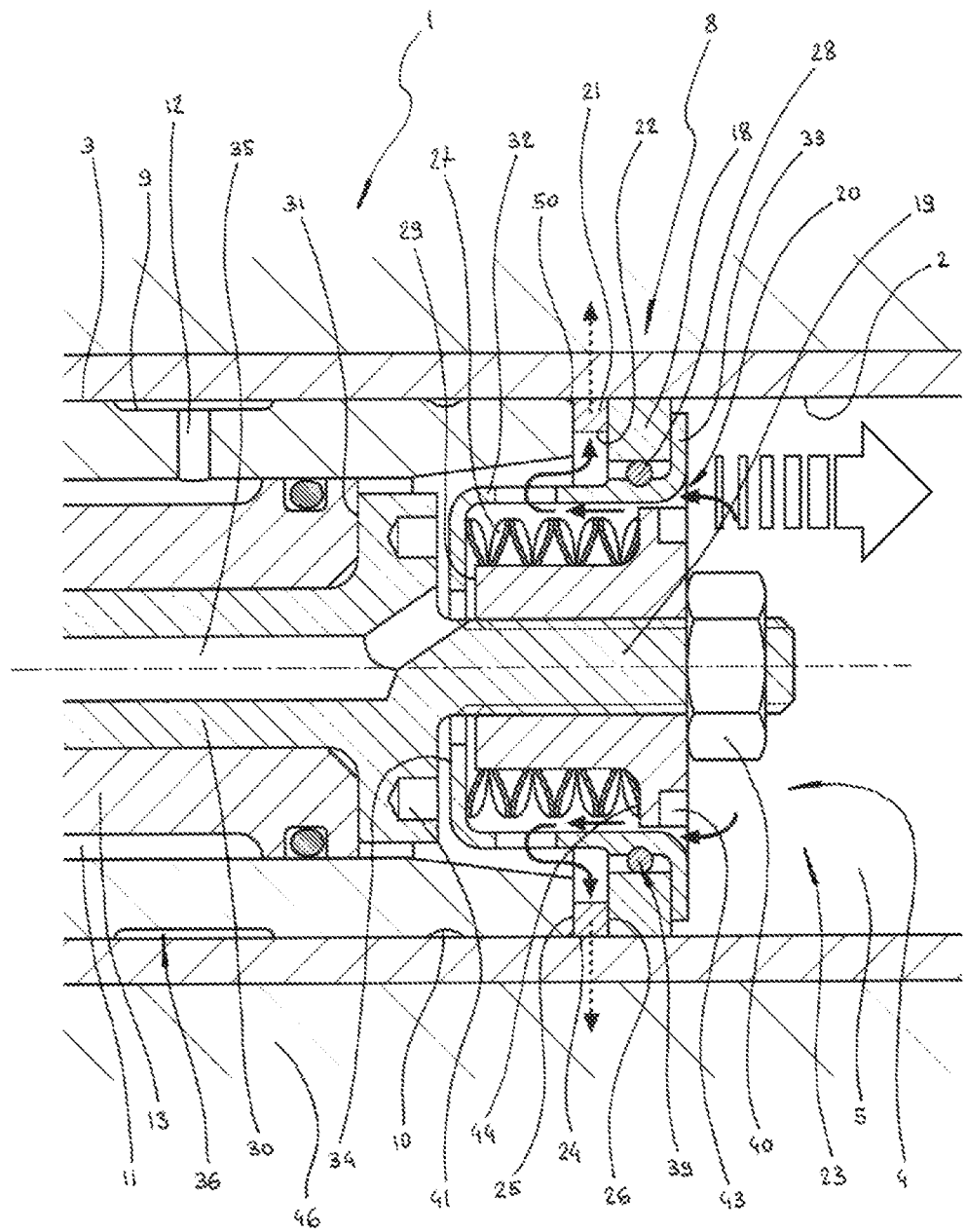

[Fig. 8]
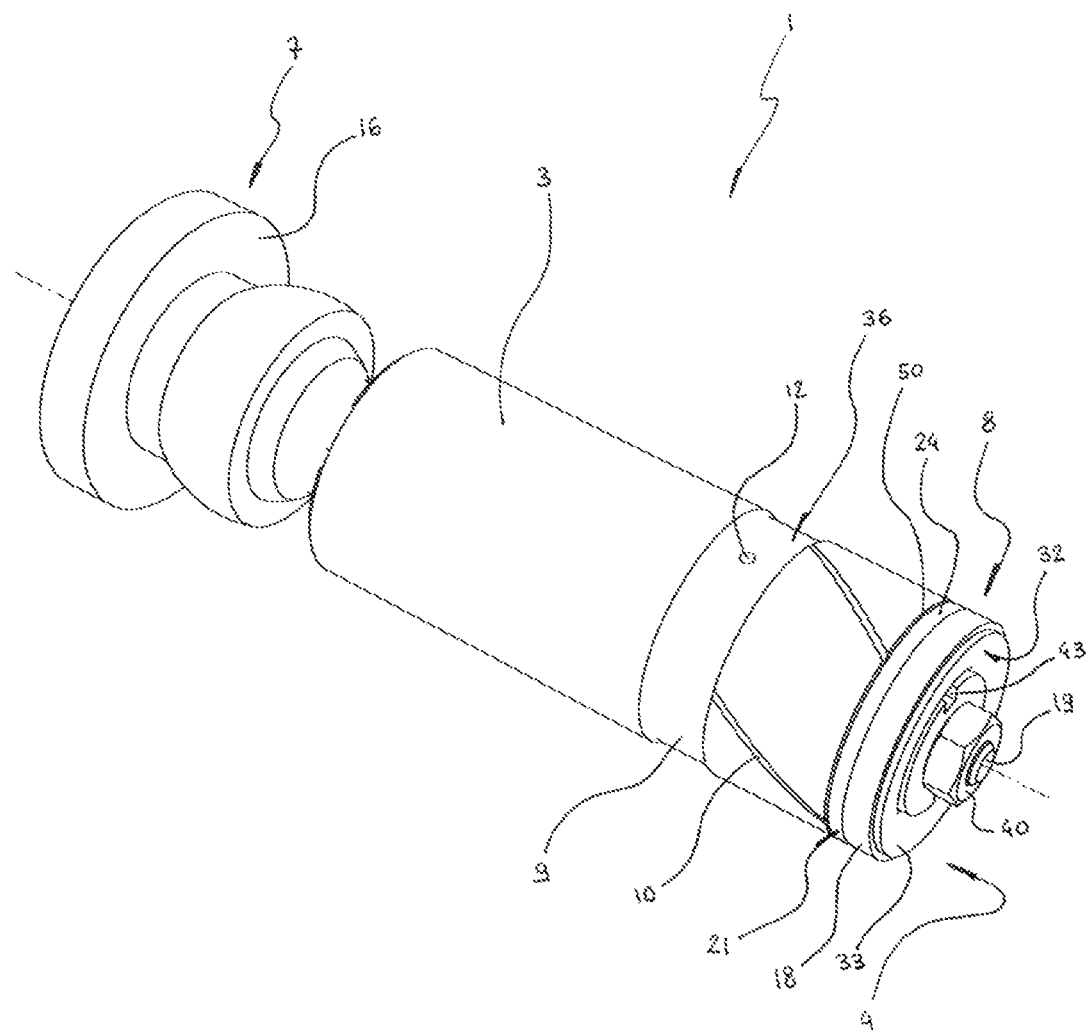

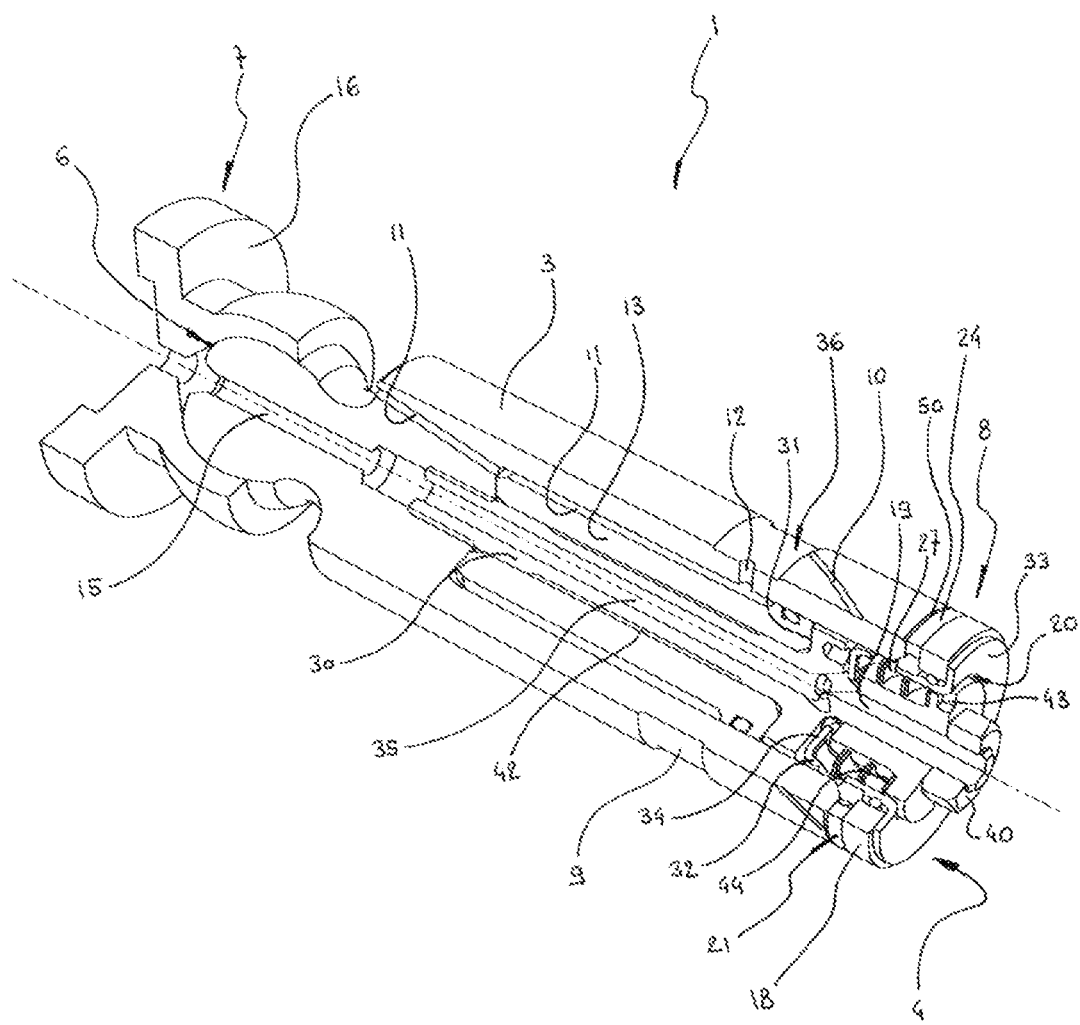
[Fig. 9]

[Fig. 10]
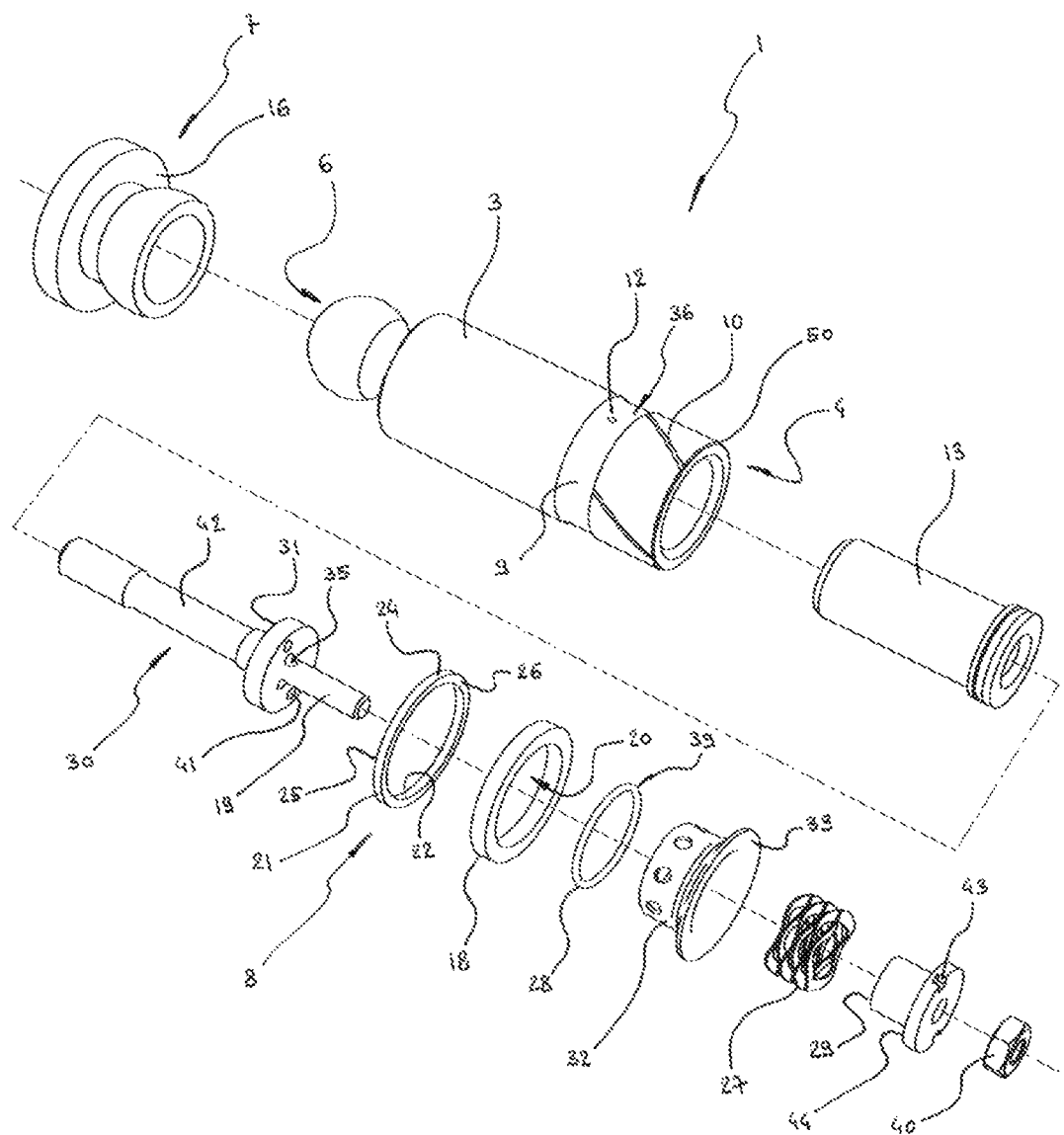

US 11,649,812 B2

HYDRAULIC PISTON WITH A DEPRESSURIZED GROOVE

This application claims priority to U.S. Provisional Patent Application No. 63/002,627 filed Mar. 31, 2020, the entire contents of which are hereby incorporated by reference.

BACKGROUND OF THE INVENTION

Field of the Invention

The present invention relates to a hydraulic piston with a depressurized groove in particular intended to be equipped with the sealing device for a piston described in patent No. FR 3 009 037 published on Jan. 29, 2016 and belonging to the applicant.

The hydraulic piston with a depressurized groove according to the invention applies primarily to axial piston hydraulic pumps and motors, regardless of their maximum operating pressure. However, this does not exclude the application of said invention to any other type of hydraulic pump or motor comprising one or more pistons.

Description of the Related Art

It is known that the sealing device according to patent FR 3 009 037 s intended for a piston which moves in a cylinder, one of the ends of which is closed by a fluid chamber.

In patent FR 3 009 037, it is noted that the piston which is equipped with the sealing device has a piston head which comprises a fixed skirt. Said piston also comprises on the one hand, a piston bearing face to exert a force on transmission means and on the other hand, a compression face which emerges into the fluid chamber to receive the pressure of a fluid.

The sealing device according to patent FR 3 009 037 comprises in particular a cylindrically-shaped sliding skirt which is accommodated with a small play in the cylinder and which is arranged in the extension of the piston head, on the side of the compression face of said piston, and in the axis of said head.

Still according to patent FR 3 009 037, the sliding skirt is connected to the piston head by a mechanical inter-skirt connection which enables said sliding skirt to move in longitudinal translation with respect to said head.

It is to be noted that the sealing device according to patent FR 3 009 037 also comprises a pressure transmission channel arranged inside the sliding skirt and passing right through the latter in the axial direction.

The sealing device according to patent FR 3 009 037 also comprises an extensible continuous segment of continuous annular shape, interposed between the fixed skirt and the sliding skirt, and comprising an internal cylindrical segment face subjected to the pressure of the fluid via the pressure transmission channel, an external cylindrical segment face capable of coming into contact with the cylinder, an axial segment face on the side of the fixed skirt held in sealed contact with the fixed skirt, and an axial segment face on the side of the sliding skirt held in sealed contact with the sliding skirt.

Finally, the sealing device according to patent FR 3 009 037 comprises a sliding skirt spring which tends to bring the sliding skirt closer to the fixed skirt, and to compress the extensible continuous segment axially.

The sealing device according to patent FR 3 009 037 makes it possible to ensure a long-time, high-level tightness between the piston and the cylinder with which it cooperates. In fact, by expanding under the effect of the pressure, the extensible continuous segment comes into contact with the cylinder and prevents the hydraulic fluid contained in the fluid chamber from escaping from the latter, without said segment exerting any excessive pressure on said cylinder.

The result of this particular configuration is excellent sealing of the hydraulic piston which is equipped with said device without excessive friction losses and this, even if the hydraulic pump which is equipped with said piston operates under high pressures of several hundred or even several thousand bars.

In practice, the sealing device according to patent FR 3 009 037 proves to be very effective, especially when it is provided on guided hydraulic pistons such as those included in the hydraulic motor-pump with fixed or variable cylinder capacity, disclosed by patent WO 2014/118477 published on Aug. 4, 2015 and belonging to the applicant.

However, for the extensible continuous segment of the sealing device according to patent FR 3 009 037 to operate correctly, it is necessary that, on the one hand, the sliding skirt forms a sufficient seal with the cylinder in which it is accommodated and that, on the other hand, the fixed skirt of the hydraulic piston which is equipped with said device is sufficiently leaky.

Because indeed, to expand and achieve the desired seal with the cylinder, the extensible continuous segment must be subjected to a sufficient radial pressure difference between its internal cylindrical segment face subjected to the pressure of the fluid via the pressure transmission channel, and its external cylindrical segment face which is capable to come into contact with the cylinder. However, said difference results from the gap in the seal between that produced by the sliding skirt, which must be high, and that produced by the fixed skirt, which must be low.

If the sealing device according to patent FR 3 009 037 is provided on the axial pistons of a conventional pump or hydraulic motor, unlike the fixed or variable cylinder capacity hydraulic motor-pump object of patent WO 2014/118477 which provides a guided hydraulic piston pusher, the fixed skirt of said axial pistons is to orientate the latter in their cylinder while said skirt is subjected to significant radial forces.

Indeed, in a conventional pump or axial piston motor, the pistons are most often accommodated in a rotating barrel and are terminated by an articulated shoe which slides on a tilted or tilting plate depending on whether said pump or said motor is with a fixed or variable cylinder capacity.

It results from this particular configuration that each piston s subjected to high radial forces. Indeed, when the tilting plate is highly inclined and when a high pressure prevails in the fluid chamber, the articulated shoe that each said piston has exerts a high radial force on said plate. Said force in return produces equally high radial forces which are exerted by each said piston on the cylinder in which it moves.

A first radial force appears between said piston and said cylinder at the end of said piston which is positioned opposite the articulated shoe, while a second radial force appears at the end of the cylinder which emerges towards the inclined plate.

For the same pressure prevailing in the fluid chamber, the more the plate is inclined and the more the piston comes out of the rotating barrel, and the higher are the two radial forces which have just been described.

It is to be noted that the radial force exerted by the piston on the outlet of the cylinder is equal to the radial force exerted by the articulated shoe on the inclined plate increased by the radial force exerted on the cylinder by the piston end opposite said shoe.

The efforts which have just been described are the source of the difficulties encountered during the implementation of the sealing device according to patent No. FR 3 009 037 on conventional axial piston pumps and motors.

In fact, in this particular context of application of said device, the fixed skirt of the hydraulic piston must firstly be sufficiently leaking to allow the extensible continuous segment to operate, and secondly, capable of ensuring a little energy dissipative contact between the piston and its cylinder despite the high radial forces produced between these two members, and more particularly, despite the high radial forces occurring at the outlet of the cylinder oriented towards the inclined plate.

In fact, to make the fixed skirt sufficiently leaking, it is possible either to provide a large play between said skirt and the cylinder, or to arrange axial decompression grooves on the surface of said skirt to cancel the sealing of the latter as provided for in patent WO 2017109329 entitled "Cooling and lubrication system for a piston sealing device" the application of which was published on Jun. 29, 2017.

But the arrangements which have just been described are not satisfactory, because whether it is one or the other, these two solutions increase the friction losses generated at the interface of the fixed skirt and the cylinder.

Indeed, an increased play between the fixed skirt and the cylinder reduces the bearing surface of said skirt on said cylinder. As the contact between these parts is more punctual, more pressure is exerted on the oil film, which becomes less bearing, less thick, and more viscous. The coefficient of friction between the fixed skirt and the cylinder is increased, as well as the resulting energy losses.

If, as an alternative, axial decompression grooves are provided on the surface of the fixed skirt, said grooves locally break the bearing capacity of the oil film. This also tends to increase the friction losses generated at the interface of said fixed skirt and the cylinder.

The two strategies which have just been described therefore increase the friction losses and correspondingly reduce the total efficiency of any conventional hydraulic pump which is equipped with the sealing device according to patent FR 3 009 037. This is particularly obvious when said pump operates at high power, that is to say under high pressure and cylinder capacity.

It is indeed noted that at low cylinder capacity, that is to say when the plate of said pump is slightly inclined and that the radial forces between the piston and the cylinder are low, the total energy efficiency of a conventional hydraulic pump equipped with the sealing device according to patent FR 3 009 037 is much higher than that of the same said pump not equipped with said device.

However, if the cylinder capacity of said pump is close to its maximum, which implies that its plate is also inclined close to the maximum, the friction losses of said pump are increased to such an extent that the energy benefit provided by the sealing device according to patent FR 3 009 037 is greatly reduced, or even annihilated, to the extent to the result of a loss.

It therefore emerges from tests and experience feedback that when the sealing device according to patent FR 3 009 037 equips the axial pistons of conventional hydraulic pumps and motors, the additional energy losses by friction that it induces at the contact between said pistons and their cylinder are high at high cylinder capacity to the extent of being able to annihilate the significant gains in efficiency provided at low cylinder capacity by said device.

SUMMARY OF THE INVENTION

The hydraulic piston with a depressurized groove according to the invention is provided so as to eliminate the drawbacks which have just been described.

Indeed, said piston according to the invention makes it possible to implement the sealing device according to patent FR 3 009 037 on the hydraulic pistons of any axial piston pump or motor by, on the one hand, meeting all the conditions necessary for the smooth operation of the extensible continuous segment, and, on the other hand, by reducing to a normal level the energy losses due to friction of said pumps or motors when the latter operate with high cylinder capacity and high power.

Therefore, the hydraulic piston with the depressurized groove according to the invention notably makes it possible:
  To produce hydraulic pumps and motors whose axial or radial pistons are equipped with the sealing device according to the patent FR 3 009 037 and whose efficiency always remains at least higher or equal to that of the same said pumps and motors not equipped with said device;
  To open the market for sealing devices according to the FR 3 009 037 patent to hydraulic pumps and motors with axial or radial pistons which would otherwise remain confined to devices whose pistons are not subjected to radial forces.

In addition, the hydraulic piston with a depressurized groove according to the invention also makes possible, according to a particular embodiment:
  To simplify the manufacture, assembly, and adjustment of the sealing device according to patent FR 3 009 037 when the latter applies to conventional axial or radial piston hydraulic pumps and motors;
  To reduce the cost of manufacturing the sealing device according to patent FR 3 009 037 when the latter applies to pumps and hydraulic motors with conventional axial or radial pistons.

The hydraulic piston with a depressurized groove according to the invention according to the invention is inexpensive to mass-produce, in order to remain compatible with the economic constraints of most of the applications for which it is intended.

It is understood that the hydraulic piston with a depressurized groove according to the invention can be applied, in addition to hydraulic pumps and motors with axial or radial pistons, to any piston of any hydraulic or pneumatic device which can advantageously be equipped with the sealing device according to patent FR 3 009 037, or which can be equipped with, as an alternative to said device, one or more cut segments or any other sealing means which only works correctly on the condition of being mounted on a piston whose fixed skirt is sufficiently leaking.

The hydraulic piston with a depressurized groove according to the present invention is capable of translating in a cylinder, the external cylindrical surface of said piston constituting a fixed skirt while one of the ends of said piston has an axial compression face which forms with the cylinder a fluid chamber of variable volume filled with a working fluid, the other end of said piston having an axial working face which cooperates with transmission means, said piston comprising:
  Sealing means positioned in the vicinity of the axial compression face, on the fixed skirt or at the end of the fixed skirt; such means being capable of contacting the cylinder;

At least one depressurized radial groove emerging onto the surface of the fixed skirt; such groove can be continuous or non-continuous;

At least one axial decompression duct arranged inside the fixed skirt and emerging in the vicinity of the axial working face;

At least one radial decompression duct that connects the depressurized radial groove to the axial decompression duct.

The hydraulic piston with a depressurized groove according to the present invention comprises at least one axial decompression groove which emerges onto the surface of the fixed skirt and connects the sealing means with the depressurized radial groove; said axial groove can be continuous or non-continuous.

The hydraulic piston with a depressurized groove in accordance with the present invention includes an axial decompression groove that is helical.

The hydraulic piston with a depressurized groove according to the present invention comprises a fixed skirt which is hollow and which permanently and sealingly accommodates a decompression sleeve, a radial space left between the inside of said skirt and the outside of said sleeve forming at least part of the axial decompression duct.

The hydraulic piston with a depressurized groove according to the present invention comprises a decompression sleeve which accommodates an internal sleeve lubrication duct which cooperates with an piston internal lubrication duct, the latter emerging at or in the vicinity of the axial working face, so as to convey part of the working fluid from the fluid chamber to the transmission means.

The hydraulic piston with a depressurized groove according to the present invention comprises sealing means which comprise:

At least one cylindrically-shaped sliding skirt, accommodated with a small play in the cylinder and arranged in the extension and in the axis of the fixed skirt on the side of the axial compression face, said sliding skirt being connected to the fixed skirt by a mechanical inter-skirt connection which makes possible a movement in longitudinal translation of said sliding skirt with respect to the fixed skirt, the amplitude of said movement being limited by a sliding skirt stop which is directly or indirectly integral with the mechanical inter-skirt connection;

At least one pressure transmission channel formed inside the sliding skirt and passing right through the sliding skirt in the axial direction;

At least one extensible continuous segment of continuous annular shape, interposed between the fixed skirt and the sliding skirt, and having a segment internal cylindrical face subjected to the pressure of the working fluid via the pressure transmission channel, an external cylindrical segment face capable of coming into contact with the cylinder, a segment axial face on the fixed skirt side held directly or indirectly in sealed contact with the fixed skirt and a segment axial face on the sliding skirt side held directly or indirectly in sealed contact with the sliding skirt.

The hydraulic piston with a depressurized groove according to the present invention includes at least one sliding skirt spring which tends to bring the sliding skirt closer to the fixed skirt, and to axially compress the extensible continuous segment.

The hydraulic piston with a depressurized groove according to the present invention includes a mechanical inter-skirt connection that comprises a double-threaded screw that has a first thread which is screwed into an internal thread formed inside the fixed skirt and which axially presses the decompression sleeve in the fixed skirt by means of a screw shoulder, and a second thread on which is screwed the sliding skirt stop.

The hydraulic piston with a depressurized groove according to the present invention comprises a sliding skirt spring which is accommodated in a spring basket which passes through all or part of the sliding skirt, the radial thickness of the sliding skirt being provided sufficiently small for allowing said skirt to accommodate said basket at the center thereof, said basket having, on the one hand, an basket external flap which rests on the sliding skirt, and, on the other hand, an basket internal flap on which one end of the sliding skirt spring rests, the other end of the sliding skirt spring resting on a spring support shoulder arranged on or attached to the mechanical inter-skirt connection.

The hydraulic piston with a depressurized groove according to the present invention comprises an external surface of the spring basket which has centering means which radially center the spring basket in the sliding skirt, while the axial orientation of said basket in relation to said skirt being ensured by the contact between the basket external flap and said skirt.

The hydraulic piston with a depressurized groove according to the present invention comprises a sliding skirt stop which can bear either on the basket external flap or on the basket internal flap.

The hydraulic piston with a depressurized groove according to the present invention comprises a mechanical inter-skirt connection that accommodates a connection internal lubricating duct which cooperates with a piston internal lubrication duct, the latter emerging at or in the vicinity of the axial working face, in order to convey part of the working fluid from the fluid chamber to the transmission means.

The hydraulic piston with a depressurized groove according to the present invention has an axial length of the depressurized radial groove which is greater than a diameter of the radial decompression duct, so that said groove forms a working fluid reservoir.

BRIEF DESCRIPTION OF THE DRAWINGS

The following description of the appended drawings, which are supplied as non-exhaustive examples, will provide a better understanding of the invention, of its features, and of the potential benefits:

FIG. 1 is a schematic cross-section view of a variable cylinder capacity hydraulic pump equipped with hydraulic pistons with depressurized grooves according to the invention, the pistons being axially oriented.

FIG. 2 is a schematic cross-section view of the hydraulic piston with a depressurized groove according to the invention, the sealing means of which consist of a cut segment.

FIG. 3 is a schematic cross-section view of the hydraulic piston with a depressurized groove according to the invention, a decompression sleeve being screwed directly into the fixed skirt to form with the latter part of the axial decompression duct, while the sealing means consist of a cut segment.

FIG. 4 is a schematic cross-section view of the hydraulic piston with a depressurized groove according to the invention, a decompression sleeve being fixed in the fixed skirt by means of a screw to form with said skirt a part of the axial decompression duct, while the sealing means consist of a cut segment.

FIG. 5 is a schematic cross-section view of the hydraulic piston with a depressurized groove according to the invention, a decompression sleeve being fixed in the fixed skirt by means of a double thread screw to form with said skirt a part of the axial decompression duct, the sealing means consisting of an extensible continuous segment tightly held between a sliding skirt and the fixed skirt by a sliding skirt spring.

FIG. 6 is a close schematic cross-section view of the hydraulic piston with a depressurized groove according to the invention and according to its variant shown in FIG. 5, which illustrates the operation of said piston when the working fluid is admitted into the fluid chamber.

FIG. 7 is a close schematic cross-section view of the hydraulic piston with a depressurized groove according to the invention and according to its variant shown in FIG. 5, which illustrates the operation of said piston when the working fluid is forced out of the fluid chamber.

FIG. 8 is a three-dimensional view of the hydraulic piston with a depressurized groove according to the invention, the sealing means of which consist of an expandable continuous segment tightly held between a sliding skirt and the fixed skirt by a sliding skirt spring.

FIG. 9 is a cut-away three-dimensional view of the hydraulic piston with a depressurized groove according to the invention and according to its variant shown in FIG. 8, which makes it possible in particular to distinguish a decompression sleeve fixed in the fixed skirt by means of a double-thread screw.

FIG. 10 is an exploded three-dimensional view of the hydraulic piston with a depressurized groove according to the invention and according to the variant shown in FIGS. 8 and 9, on which the various components which form said variant can be clearly distinguished.

DESCRIPTION OF THE PREFERRED EMBODIMENTS

FIGS. 1 to 10 show the hydraulic piston 1 with a depressurized groove according to the invention, various details of the components thereof, variants thereof, and accessories thereof.

It can be seen, particularly in FIGS. 1 to 5, that the hydraulic piston 1 with a depressurized groove according to the invention can translate in a cylinder 2, the external cylindrical surface of said piston 1 constituting a fixed skirt 3 while one of the ends of said piston 1 has an axial compression face 4 which forms with the cylinder 2 a fluid chamber 5 of variable volume filled with a working fluid 23, the other end of said piston 1 having an axial working face 6 which cooperates with transmission means 7.

It is to be noted in FIGS. 1 to 10 that the hydraulic piston 1 with a depressurized groove according to the invention comprises sealing means 8 positioned in the vicinity of the axial compression face 4. Said means 8 are arranged or accommodated either on the fixed skirt 3, or at the end of the latter.

It is to be noted in FIGS. 1 to 7 that the sealing means 8 can come into contact with the cylinder 2 and, as an example and as shown in FIGS. 2 to 4, can consist of a cut segment 38, known per se, accommodated in a groove.

Said means 8 can also consist of any other sealing device, the operation of which requires that the fixed skirt 3 is preferably leaky and non-sealed.

It will be noted in FIGS. 1 to 10 that in FIGS. 1 to 10 that the hydraulic piston 1 with a depressurized groove according to the invention comprises at least one radial depressurized groove 9 emerging at the surface of the fixed skirt 3; said groove 9 can be continuous or non-continuous.

It should also be noted that the depressurized radial groove 9 is positioned axially on the fixed skirt 3 so that it will never be able to exit the cylinder 2 regardless of the axial position of said skirt 3 in relation to that cylinder 2.

It can particularly be seen in FIGS. 1 to 7 and FIG. 9, the hydraulic piston 1 with a depressurized groove according to the invention includes at least one axial decompression duct 11 fitted inside the fixed skirt 3 and emerging in the vicinity of the axial working face 6.

As an example shown in FIG. 1, the axial decompression duct 11 may emerge inside the pump casing 49 of a variable cylinder capacity axial piston hydraulic pump 37, the pressure prevailing in said casing 49 being low compared to that reached inside the fluid chamber 5.

Finally, as can be clearly seen in FIGS. 2 to 10, the hydraulic piston 1 with a depressurized groove according to the invention includes at least one radial decompression duct 12 which puts the depressurized radial groove 9 in communication with the axial decompression duct 11.

In FIGS. 5 to 10, it has been shown that the hydraulic piston 1 with a depressurized groove according to the invention may include at least one axial decompression groove 10 which emerges onto the surface of the fixed skirt 3 and which connects the sealing means 8 with the depressurized radial groove 9; said axial groove 10 can be continuous or non-continuous.

It should also be noted that according to this variant of the hydraulic piston 1 with a depressurized groove according to the invention, the axial decompression groove 10 may be helical to prevent the local lack bearing capacity it produces from remaining oriented in a single angular position relative to the hydraulic piston 1 with a depressurized groove during the travel of the latter in the cylinder 2.

It should be noted that according to another variant of the hydraulic piston 1 with a depressurized groove according to the invention shown in FIG. 1, FIGS. 3 to 7 and FIGS. 9 and 10, the fixed skirt 3 may be hollow and may fixedly and sealingly accommodate a decompression sleeve 13, a radial space existing between the inside of said skirt 3 and the outside of said sleeve 13 forming at least part of the axial decompression duct 11.

It is to be noted that the decompression sleeve 13 can be held in place inside skirt 3 by means of at least one sleeve screw 51 as shown in FIG. 4, by a clip or rivet, or more directly by screwing as shown in FIG. 3, by welding, by crimping, or by any fastening means known to the skilled person.

It is also to be noted that one or more joints made of elastomer, annealed copper or any material can be inserted between the inside of the fixed skirt 3 and the decompression sleeve 13 to complete the sealing between these two parts 3, 13.

Advantageously, the end of the decompression sleeve 13 which is closest to the axial working face 6 may be flat, conical, spherical, or of any geometry, this being provided to form a sealed contact with an additional bearing wall arranged inside the fixed skirt 3.

It is to be noted in FIG. 3 that the decompression sleeve 13 can advantageously accommodate a sleeve internal lubrication duct 14 which cooperates with a piston internal lubrication duct 15, the latter emerging at or near the axial working face 6.

This special configuration makes possible to convey part of the working fluid 23 from the fluid chamber 5 to the transmission means 7 to lubricate the latter, which can, for example, be designed as an articulated shoe 16 sliding on a tray 17 that can be tilted or not.

In FIG. 1 and then in FIGS. 5 to 10, it is shown that according to a particular embodiment of the hydraulic piston 1 with a depressurized groove according to the invention, the sealing means 8 may consist of at least one cylindrically-shaped sliding skirt 18, accommodated with small play in the cylinder 2 and arranged in the extension direction of the fixed skirt 3 and in the axis thereof, on the side of the axial compression face 4.

According to this particular configuration of the sealing means 8, the sliding skirt 18 is connected to the fixed skirt 3 by a mechanical inter-skirt connection 19 which permits the longitudinal translation movement of said sliding skirt 18 with respect to the fixed skirt 3, the amplitude of said movement being limited by a sliding skirt stop 29 which is directly or indirectly integral with the mechanical inter-skirt connection 19.

It should be noted, moreover, that the sliding skirt stop 29 can be attached to the mechanical inter-skirt connection 19 by screwing with blocking by means of a lock nut 40 or not, by welding, by crimping, or by any other fastening means known to the skilled person.

Still according to said particular configuration of the sealing means 8, it is to be noted, particularly in FIGS. 6 and 7, that at least one pressure transmission channel 20 is arranged inside the sliding skirt 18 and passes right through the latter in the axial direction.

FIG. 1 and FIGS. 5 to 10 further show that according to said particular configuration of the sealing means 8 of the hydraulic piston 1 with a depressurized groove according to the invention, at least one extensible continuous segment 21 of continuous annular shape is interposed between the fixed skirt 3 and the sliding skirt 18, and has a segment internal cylindrical face 22 subjected to the pressure of the working fluid 23 via the pressure transmission channel 20, a segment external cylindrical face 24 being able to come into contact with the cylinder 2, a segment axial face 25 on the fixed skirt side held directly or indirectly in sealed contact with the fixed skirt 3 and a segment axial face 26 on the sliding skirt side held directly or indirectly in sealed contact with the sliding skirt 18.

As a variant of said particular configuration of the sealing means 8 of the hydraulic piston 1 with a depressurized groove according to the invention, it has been evidently shown in FIGS. 5 to 7 and in FIGS. 9 and 10 that at least a sliding skirt spring 27 may be provided which tends to bring the sliding skirt 18 closer to the fixed skirt 3, and to axially compress the extensible continuous segment 21.

It is to be noted that the sliding skirt spring 27 may for example be helical, or else formed by a multi-turn wave spring as shown in FIG. 1, FIGS. 5 to 7 and FIGS. 9 and 10, the latter type of spring having the advantage of an angularly uniform support. These examples being provided only as a non-limiting example, the sliding skirt spring 27 can also be of any type known to those skilled in the art.

Insofar as the sealing means 8 consist in particular of an extensible continuous segment 21 interposed between a sliding skirt 18 and the fixed skirt 3 as has just been described, it is to be noted that the mechanical inter-skirt connection 19 may consist of a double-threaded screw 30 shown in FIG. 1, in FIGS. 5 to 7 and in FIGS. 9 and 10.

In this case, the double-threaded screw 30 has a first thread which is screwed into an internal thread formed inside the fixed skirt 3 and which axially hold the decompression sleeve 13 in said skirt 3 by means of a screw shoulder 31, and a second thread onto which the sliding skirt stop 29 is screwed.

It is to be noted that as a particular embodiment of the hydraulic piston 1 with a depressurized groove according to the invention, the screw shoulder 31 can provide a shoulder wrench socket 41 making it possible to tighten the double-threaded screw 30 in the fixed skirt 3. As an alternative and for the same purpose, a wrench or screwdriver socket can be formed at the end of the second thread.

It is also noted that the double-thread screw 30 may have a narrowing of diameter 42 over part of its length as shown in FIGS. 9 and 10, this being provided to locally reduce the section thereof and give it more elasticity, and in order to prevent any loosening of said screw 30.

As shown in FIGS. 5 to 10, a stop wrench socket 43 can be provided on the sliding skirt stop 29 which makes possible to immobilize the latter when it is blocked in position by a lock nut 40.

According to a variant of the hydraulic piston 1 with a depressurized groove according to the invention shown in FIGS. 5 to 10, the sliding skirt spring 27 can be accommodated in a spring basket 32 which passes through all or part of the sliding skirt 18, the radial thickness of the latter being sufficiently small that said skirt 18 can accommodate said basket 32 in its center.

In this case, the spring basket 32 may have, on the one hand, a basket external flap 33 which bears on the sliding skirt 18, and on the other hand, a basket internal flap 34 on which bears one end of the slip skirt spring 27, the other end of the spring bearing on a spring support shoulder 44 formed or attached on the mechanical inter-skirt connection 19.

FIGS. 5 to 7 and FIGS. 9 and 10 show that the spring support shoulder 44 can be formed on the sliding skirt stop 29, the latter being screwed to the second thread of a double-thread screw 30.

As can be clearly seen in FIG. 10, the spring basket 32 can be advantageously apertured to allow the working fluid to circulate.

In FIGS. 6, 7 and 10, it is to be noted that the external surface of the spring basket 32 may have centering means 39 radially centering said basket 32 in the sliding skirt 18, the axial orientation of said basket 32 in relation to said skirt 18 being ensured by the contact between the basket external flap 33 and said skirt 18.

As shown in FIGS. 6, 7 and 10 in a particularly visible way, the centering means 39 may, for example, consist of an elastic ring 28 which encloses a groove formed on the periphery of the body of the spring basket 32, or consist of a boss formed on the periphery of said body.

It should be rioted that the sliding skirt stop 29 can be supported either on the basket external flap 33 or on the basket internal flap as shown in FIGS. 6 and 7.

As shown in FIGS. 5 to 7 and FIGS. 9 and 10, the mechanical inter-skirt connection 19 can accommodate a connection internal lubrication duct 35 which cooperates with a piston internal lubrication duct 15, the latter emerging at or in the vicinity of the axial working face 6, in order to convey part of the working fluid 23 from the fluid chamber 5 to the transmission means 7 to lubricate the latter.

Like what has been previously presented, it is to be noted that the transmission means 7 may for example consist of an articulated shoe 16 sliding on a plate 17 that can be tilted or not.

It is to be rioted that, as clearly shown in FIGS. 5 to 7, the connection internal lubrication duct 35 may be formed of an axial duct and one or more radial ducts. In FIGS. 5 to 10, there is shown a particular embodiment of the hydraulic piston 1 with a depressurized groove according to the invention, according to which the axial length of the depressurized radial groove 9 can be greater than the diameter of the radial duct of decompression 12.

According to this advantageous variant, the depressurized radial groove 9 constitutes a working fluid tank 36 which never empties entirely via the radial decompression duct 12 during the movement of the hydraulic piston 1 with a depressurized groove according to the invention in the cylinder 2, and under the effect of the acceleration which results from said movement.

This particular configuration of the hydraulic piston 1 with a depressurized groove according to the invention forces the working fluid 23 to intrude between the fixed skirt 3 and the cylinder 2, to ensure its lubrication during said movement.

Operation of the Invention

The operation of the hydraulic piston 1 with a depressurized groove according to the invention is easily understood in view of FIGS. 1 to 10 which show non-limiting examples of embodiments of said invention.

FIG. 1 shows the hydraulic piston 1 with a depressurized groove according to the invention applied to a variable cylinder capacity hydraulic pump 37 having axial pistons, known per se, said pump 37 having a pump casing 49 in which its main components are accommodated.

In FIG. 1 and FIGS. 5 to 10, it has been shown that the sealing means 8 can advantageously consist of an extensible continuous segment 21 held clamped between a sliding skirt 18 and the fixed skirt 3 by a sliding skirt spring 27. It can therefore be seen that said means 8 are here, and by way of non-limiting example, those provided by the sealing device for a piston described in patent No. FR 3 009 037 belonging to the applicant.

When the transmission shaft 45 of the variable cylinder capacity hydraulic pump 37 having axial pistons is rotated by a power source not shown, it in turn rotates a barrel 46, which it is attached to.

When the tiltable tray 17 of said pump 37 is tilted, the hydraulic pistons 1 with depressurized groove which said pump 37 accommodates move back and forth in the cylinder 2 with which they cooperate.

As a result, in a first step, and as shown in FIG. 6, these pistons 1 draw working fluid 23 into an intake duct 47 which comprises the variable cylinder capacity hydraulic pump 37 having axial pistons shown in FIG. 1.

For example, the intake duct 47 is supplied with working fluid 23 at a pressure of 10 bar, while the inside of the pump casing 49 is subjected to atmospheric pressure. In particular, this pressure deviation makes it possible to hold at any time the hydraulic pistons 1 with depressurized groove on the tilting plate 17, by means of an articulated shoe 16.

In a second step and as shown in FIG. 7, the hydraulic pistons 1 with depressurized groove which equip the variable cylinder capacity hydraulic pump 37 with axial pistons shown in FIG. 1 expel the working fluid 23 which they have previously admitted into a discharge duct 48 which includes that pump 37, this under a pressure of, for example, four hundred bar.

Having reminded the normal operation of the variable cylinder capacity hydraulic pump 37 having axial pistons, focus will be made on the operation of the hydraulic piston 1 with a depressurized groove when the sealing means 8 that it includes are formed by the sealing device for piston subject of the patent FR 3 009 037.

It was reminded in the preamble of the present patent application that, to function effectively, the device of the patent FR 3 009 037 must cooperate with a fixed skirt 3 which is sufficiently leaky to allow the extensible continuous segment 21 of the device to expand under the effect of the pressure prevailing in the fluid chamber 5.

In addition to this first condition necessary for the proper functioning of the device of the patent FR 3 009 037, we have also reminded that if the latter equips a variable cylinder capacity hydraulic pump 37 with axial pistons as shown in FIG. 1, the fixed skirt 3 must remain properly supported by the working fluid lubricating film 23, which makes possible it to slide with low friction on the cylinder 2. This is particularly true at the outlet of cylinder 2, which leads to the inside of the pump casing 49 and on which the fixed skirt 3 exerts significant radial forces.

As such, any groove made on the surface of the fixed skirt 3 and passing at the level of said outlet of the cylinder 2 significantly increases the energy loss by friction generated at the interface of said skirt 3 and of said cylinder 2, at the level of said outlet.

This loss is particularly high when the cylinder capacity of the variable cylinder capacity hydraulic pump 37 with axial pistons is close to its maximum, that is to say when the inclination of the tilting plate 17 of said pump 37 is also close to its maximum.

Indeed, at full cylinder capacity of said pump 37, the pistons of the latter brace in the cylinders 2 with which they cooperate. This generates a large radial load between said pistons and said cylinders 2, particularly at the outlet of said cylinders 2 into the pump casing 49.

This is the reason why the hydraulic piston 1 with a depressurized groove according to the invention makes it possible that the axial portion of the fixed skirt 3 which slides in contact with the outlet of the cylinder 2 exposes a smooth surface free from any decompression groove, this while allowing the extensible continuous segment 21 to function correctly thanks to a fixed skirt 3 sufficiently leaking.

In addition to avoiding the use of any decompression groove whatsoever to make the fixed skirt 3 sufficiently leaky, the hydraulic piston 1 with a depressurized groove also avoids having to resort to an increased play between the fixed skirt 3 and the cylinder 2 to depressurize said skirt 3. A normal play between the fixed skirt 3 and the cylinder 2 can thus be preserved, so that the bearing surface of said skirt 3 on said cylinder 2 remains normally extended and that the pressure exerted on the film of working fluid 23 interposed between said skirt 3 and said cylinder 2 remains sufficiently low.

In fact, the higher said pressure, the lower the thickness of the working fluid film 23, the higher the viscosity of said film, and the greater are the energy losses by friction generated at the bearing surface of the fixed skirt 3 on cylinder 2.

To avoid any decompression groove and any increase in the play as has just been described, the hydraulic piston 1 with a depressurized groove according to the invention comprises a depressurized radial groove 9 which emerges onto the surface of the fixed skirt 3. This is clearly visible in FIGS. 1 to 10.

The depressurized radial groove 9 is axially positioned on the fixed skirt 3 so as to never exit from the cylinder 2 whatever the axial position of said skirt 3 with respect to said cylinder 2. Being so positioned, the depressurized radial groove 9 does not occupy the place of any bearing surface whatsoever.

As can be seen in FIGS. 1 to 10, the depressurized radial groove 9 considerably reduces the leakage length between the sealing means 8 and the outlet of the cylinder 2 in the pump casing 49.

Indeed, the depressurization which according to the state of the art had to be provided from the sealing means 8 to the outlet of the cylinder 2 in the pump casing 49, that is to say over the entire length of the fixed skirt, has now to be provided only between said means 8 and the depressurized radial groove 9.

This particular configuration, specific to the hydraulic piston 1 with a depressurized groove according to the invention, makes it possible to leave free of any decompression groove and of any abnormal increase in play the axial portion of the fixed skirt 3 which slides in contact with the cylinder outlet 2.

The fact remains that the remaining portion of the fixed skirt 3 which is between the sealing means 8 and the depressurized radial groove 9 must be depressurized, either by a sufficient play left between said skirt 3 and the cylinder 2, or, as shown in FIGS. 5 to 10, by providing axial decompression grooves 10 which can advantageously be helical and which emerge at the surface of the fixed skirt 3 to put the sealing means 8 in communication with the depressurized radial groove 9.

The portion of the fixed skirt 3 provided with axial decompression grooves 10 being slightly radially loaded, the reduction in the total efficiency of the variable cylinder capacity hydraulic pump 37 with axial pistons which results from a lower bearing capacity of the film of working fluid 23 at said grooves 10 is low, or even zero.

It will be noted in FIGS. 6 to 10 that advantageously, the junction between the fixed skirt 3 and the axial compression face 4 of the hydraulic piston 1 with a depressurized groove according to the invention forms a pressure distribution chamfer 50 which makes it possible for the extensible continuous segment 21 to operate optimally over its entire circumference.

Incidentally, the pressure distribution chamfer 50 makes it possible for the working fluid 23 coming from the fluid chamber 5 and passing between the extensible continuous segment 21 and the cylinder 2 to lubricate the external surface of the fixed skirt 3 located between said chamfer 50 and the depressurized radial groove 9. This occurs in particular during the phase of suction of the working fluid 23 in the fluid chamber 5 by the hydraulic piston 1 with a depressurized groove.

FIG. 6 shows said suction phase. It is to be noted in said FIG. 6 that the extensible continuous segment 21 is parked during said phase, as illustrated by the dotted arrows. Indeed, the pressure prevailing in the fluid chamber 5 is insufficient for the pressure difference between the segment internal cylindrical face 22 and the segment external cylindrical face 24 to significantly expand said continuous segment 21.

During this suction phase, therefore, working fluid 23 from fluid chamber 5 can pass between the continuous expandable segment 21 and cylinder 2. This done, said working fluid 23 continues its path from the pressure distribution chamfer 50 to the depressurized radial groove 9, passing partly through the gap left between the external surface of the fixed skirt 3 and cylinder 2, and for the other part via the axial decompression grooves 10 which emerge at the surface of the fixed skirt 3. The path of the working fluid 23 that has just been described is symbolized in FIG. 6 by undulated arrows.

In its path, the working fluid 23 lubricates the external surface of the fixed skirt 3 extending between the pressure distribution chamfer 50 and the depressurized radial groove 9. Then, said fluid 23 fills the depressurized radial groove 9, for example half, and possibly to overflow by the radial decompression duct 12 to leak successively via said radial duct 12 then via the axial decompression duct 11, and finally to emerge in the pump casing 39 at the level of the axial working face 6.

FIG. 7 shows the discharge phase during which a pressure of our hundred bar prevails in the fluid chamber 5.

During this phase, the pressure difference between the segment internal cylindrical face 22 and the segment external cylindrical face 24 is sufficient to cause the extensible continuous segment 21 to expand to the point that the latter comes into contact with cylinder 2 and forms a seal with the latter. The expansion of this segment 21 is symbolized by dotted arrows.

The full-line arrows in FIG. 7, on the other hand, symbolize the communication of the working fluid pressure 23 contained in the fluid chamber 5 to the segment internal cylindrical face 22 of the extensible continuous segment 21 via the pressure transmission channel 20.

Moreover, it is to be noted in FIG. 7 that, advantageously, the spring basket 32 is perforated to allow the working fluid 23 to circulate better not only to communicate the pressure of the fluid chamber 5 to the segment internal cylindrical face 22, but also to ensure the lubrication of the transmission means 7 of which it has been shown in FIG. 1 that they are constituted, according to the non-limitative example of embodiment of the hydraulic piston 1 with a depressurized groove according to the invention provided here to illustrate its operation, of articulated shoes 16 cooperating with a 17 tilting plate.

Indeed, after passing through the pressure transmission channel 20 and then through the spring basket 32, a majority of the working fluid 23 enters the connection internal lubrication duct 35 formed by an axial duct and by three radial ducts which houses the mechanical inter-skirt connection 19 here consisting of a double thread screw 30.

Then and as can easily be understood from the view of FIG. 5 which gives an overview of the hydraulic piston 1 with a depressurized groove according to the invention, the working fluid 23 passes through the piston internal lubrication duct 15 to reach the articulated shoe 16 and lubricate the contact interface formed by the latter with the tilting plate 17.

As has just been demonstrated, the hydraulic piston 1 with a depressurized groove according to the invention makes it possible, on the one hand, to ensure the correct operation of the sealing device for a piston which is the subject of patent FR 3 009 037 and, on the other hand, to avoid any arrangement or formation of the fixed skirt 3 which is likely to increase the friction losses generated by said skirt 3 at the level of its contact with the outlet of the cylinder 2.

However, the sealing means 8 from patent FR 3 009 037 have been given here only by way of example. The hydraulic piston 1 with a depressurized groove according to the invention can produce its advantages for the benefit of other said means 8, the operation of which requires that the fixed skirt 3 is preferably leaky and non-sealed, while said skirt 3 remains subjected to important radial forces. For example, the hydraulic piston 1 with a depressurized groove can deliver all of its advantages if the sealing means 8 are cut segments 38 such as those shown in FIGS. 2 to 4.

It is also understood from FIGS. 1 to 10 that the hydraulic piston 1 with a depressurized groove according to the invention is simple to produce and to assemble, and does not require any expensive or complex to implement manufacturing process.

It will be noted that the exemplary embodiment of hydraulic piston 1 with a depressurized groove according to the invention which has just been described is nonlimiting. As such, said piston 1 can advantageously be applied to any hydraulic or pneumatic machine provided with pistons, regardless of the field of application of said machine.

The possibilities of the hydraulic piston 1 with a depressurized groove according to the invention are not limited to the applications which have just been described and it should also be understood that the above description has only been provided by way of example and that it in no way limits the field of said invention, from which one would not depart by replacing the details of execution described by any other equivalent.

The invention claimed is:

1. A hydraulic piston configured to translate in a cylinder, an external cylindrical surface of said piston constituting a fixed skirt, one end of said piston having an axial compression face which forms with the cylinder a fluid chamber of variable volume filled with a working fluid, another end of said piston having an axial working face which cooperates with a transmission system, said hydraulic piston comprising:
   a seal disposed in a vicinity of the axial compression face, on the fixed skirt or at an end of the fixed skirt, the seal being configured to contact the cylinder;
   at least one depressurized radial groove emerging onto the external cylindrical surface of the fixed skirt, said at least one depressurized radial groove configured to be continuous or non-continuous;
   at least one axial decompression duct disposed inside the fixed skirt and emerging in a vicinity of the axial working face; and
   at least one radial decompression duct that connects the at least one depressurized radial groove to the at least one axial decompression duct.

2. The hydraulic piston according to claim 1, further comprising at least one axial decompression groove which emerges onto the external cylindrical surface of the fixed skirt and connects the seal with the at least one depressurized radial groove, said at least one axial decompression groove being continuous or non-continuous.

3. The hydraulic piston according to claim 2, wherein the at least one axial decompression groove is helical.

4. The hydraulic piston according to claim 1, wherein the fixed skirt is hollow and sealingly accommodates a decompression sleeve, a radial space left between an inside of said fixed skirt and an outside of said decompression sleeve forming at least part of the at least one axial decompression duct.

5. The hydraulic piston according to claim 4, wherein the decompression sleeve accommodates a sleeve internal lubrication duct which cooperates with a piston internal lubrication duct, the piston internal lubrication duct emerging at or in the vicinity of the axial working face, to convey part of the working fluid from the fluid chamber to the transmission system.

6. The hydraulic piston according to claim 1, wherein the seal comprises:
   at least one cylindrically-shaped sliding skirt, accommodated with a small play in the cylinder, the at least one cylindrically-shaped sliding skirt being disposed in an extension direction along an axis of the fixed skirt on a side of the axial compression face, said at least one cylindrically-shaped sliding skirt being connected to the fixed skirt by a mechanical inter-skirt connection enabling a movement in longitudinal translation of said at least one cylindrically-shaped sliding skirt relative to the fixed skirt, an amplitude of said movement being limited by a sliding skirt stop which is directly or indirectly integral with the mechanical inter-skirt connection,
   at least one pressure transmission channel formed inside the at least one cylindrically-shaped sliding skirt and passing right through the at least one cylindrically-shaped sliding skirt in the axial direction,
   at least one extensible continuous segment of continuous annular shape, interposed between the fixed skirt and the at least one cylindrically-shaped sliding skirt, and having a segment internal cylindrical face subjected to a pressure of the working fluid via the at least one pressure transmission channel, a segment external cylindrical face configured to come into contact with the cylinder, a first segment axial face on the a side adjacent fixed skirt held directly or indirectly in sealed contact with the fixed skirt, and a second segment axial face on a side adjacent the sliding skirt held directly or indirectly in sealed contact with the at least one cylindrically-shaped sliding skirt.

7. The hydraulic piston according to claim 6, further comprising at least one sliding skirt spring configured to bring the at least one cylindrically-shaped sliding skirt closer to the fixed skirt, and to axially compress the at least one extensible continuous segment.

8. The hydraulic piston according to claim 7, wherein the at least one sliding skirt spring is accommodated in a spring basket which passes through all or part of the at least one cylindrically-shaped sliding skirt, a radial thickness of the at least one cylindrically-shaped sliding skirt being provided sufficiently small to allow said at least one cylindrically-shaped sliding skirt to accommodate said basket at a center thereof, said basket having
   a basket external flap which rests on the at least one cylindrically-shaped sliding skirt, and
   a basket internal flap on which one end of the at least one sliding skirt spring rests, another end of the at least one sliding skirt spring resting on a spring support shoulder disposed on or attached to the mechanical inter-skirt connection.

9. The hydraulic piston according to claim 8, wherein an external surface of the spring basket has a centering device which radially centers said basket in the at least one cylindrically-shaped sliding skirt, an axial orientation of said basket relative to said at least one cylindrically-shaped sliding skirt being ensured by contact between the basket external flap and said at least one cylindrically-shaped sliding skirt.

10. The hydraulic piston according to claim 8, wherein the sliding skirt stop is configured to bear on the basket internal flap via the sliding skirt spring.

11. The hydraulic piston according to claim 6, wherein the mechanical inter-skirt connection comprises a double-threaded screw that has a first thread which is screwed into an internal thread formed inside the fixed skirt and which axially presses a decompression sleeve in said fixed skirt by a screw shoulder, and a second thread on which is screwed the sliding skirt stop.

12. The hydraulic piston according to claim 6, wherein the mechanical inter-skirt connection accommodates a connection internal lubricating duct which cooperates with a piston internal lubrication duct, the piston internal lubrication duct emerging at or in the vicinity of the axial working face, in order to convey part of the working fluid from the fluid chamber to the transmission system.

13. The hydraulic piston according to claim 6, wherein the fixed skirt is hollow and sealingly accommodates a decompression sleeve, a radial space left between an inside of said fixed skirt and an outside of said decomposition sleeve forming at least part of the at least one axial decompression duct, and wherein the mechanical inter-skirt connection comprises a double-threaded screw that has a first thread which is screwed into an internal thread formed inside the fixed skirt and which axially presses the decompression sleeve in said fixed skirt by a screw shoulder, and a second thread on which is screwed the sliding skirt stop.

14. The hydraulic piston according to claim 1, wherein an axial length of the at least one depressurized radial groove is greater than a diameter of the at least one radial decompression duct, so that said at least one depressurized radial groove forms a working fluid reservoir.

\* \* \* \* \*